United States Patent
Yamasaki

(10) Patent No.: US 9,614,615 B2
(45) Date of Patent: Apr. 4, 2017

(54) LUMINAIRE AND VISIBLE LIGHT COMMUNICATION SYSTEM USING SAME

(71) Applicant: Panasonic Intellectual Property Management Co., Ltd., Osaka (JP)

(72) Inventor: Shigeaki Yamasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 65 days.

(21) Appl. No.: 14/434,295

(22) PCT Filed: Oct. 3, 2013

(86) PCT No.: PCT/JP2013/005901
§ 371 (c)(1),
(2) Date: Apr. 8, 2015

(87) PCT Pub. No.: WO2014/057632
PCT Pub. Date: Apr. 17, 2014

(65) Prior Publication Data
US 2015/0263807 A1     Sep. 17, 2015

(30) Foreign Application Priority Data

Oct. 9, 2012  (JP) ................................. 2012-224430
Oct. 9, 2012  (JP) ................................. 2012-224432

(51) Int. Cl.
*H04B 10/00*   (2013.01)
*H04B 10/116*  (2013.01)
*H05B 33/08*   (2006.01)

(52) U.S. Cl.
CPC ....... *H04B 10/116* (2013.01); *H05B 33/0854* (2013.01)

(58) Field of Classification Search
CPC ... H04B 10/116; H04B 10/112; H04B 10/114; H04B 10/1141; H04B 10/1143;
(Continued)

(56) References Cited

U.S. PATENT DOCUMENTS 5,838,116 A  *  11/1998  Katyl ................. H04B 10/1149
                                                   315/291
2004/0028006 A1     2/2004  Kayama et al.
(Continued)

FOREIGN PATENT DOCUMENTS

JP    2003-348652 A    12/2003
JP    2006-074323 A     3/2006
(Continued)

OTHER PUBLICATIONS

International Search Report issued in PCT/JP2013/005901, dated Dec. 10, 2013, with English translation.

*Primary Examiner* — Hanh Phan
(74) *Attorney, Agent, or Firm* — McDermott Will & Emery LLP

(57) ABSTRACT

A luminaire includes an electric light source, a light source driver configured to turn on the light source, and a controller configured to control the light source driver. The controller is configured to control the light source driver to transmit, with a probability lower than 50% at a prescribed time interval, an optical signal with light of the light source as a medium while the light source is in ON. The prescribed time interval is longer than a time period during which the optical signal is transmitted.

18 Claims, 2 Drawing Sheets

(58) Field of Classification Search
CPC ............ H04B 10/1149; H05B 33/0842; H05B 33/0854
USPC ....... 398/172, 118, 119, 128, 130, 127, 135, 398/115, 182, 183, 186, 187, 189; 315/307, 312, 291, 294, 297, 318, 149, 315/58, 61
See application file for complete search history.

(56) References Cited

U.S. PATENT DOCUMENTS

| | | |
|---|---|---|
| 2005/0164641 A1 | 7/2005 | Niwano |
| 2006/0044652 A1 | 3/2006 | Yamamoto |
| 2006/0251042 A1 | 11/2006 | Mikami |
| 2007/0177161 A1 | 8/2007 | Ishii et al. |
| 2010/0254712 A1* | 10/2010 | Linnartz .............. H04B 10/116 398/172 |
| 2011/0170872 A1* | 7/2011 | Shin ................... H04B 10/1149 398/78 |

FOREIGN PATENT DOCUMENTS

| | | |
|---|---|---|
| JP | 2006-203669 A | 8/2006 |
| JP | 2006-279253 A | 10/2006 |
| JP | 2007-267037 A | 10/2007 |
| JP | 2009-004321 A | 1/2009 |
| JP | 2010-283616 A | 12/2010 |
| WO | 2003-096577 A1 | 11/2003 |
| WO | 2005-086375 A1 | 9/2005 |

* cited by examiner

LUMINAIRE AND VISIBLE LIGHT COMMUNICATION SYSTEM USING SAME

RELATED APPLICATIONS

This application is the U.S. National Phase under 35 U.S.C. §371 of International Application No. PCT/JP2013/005901, filed on Oct. 3, 2013, which in turn claims the benefit of Japanese Application No. 2012-224430, filed on Oct. 9, 2012 and Japanese Application No. 2012-224432, filed on Oct. 9, 2012, the disclosures of which Applications are incorporated by reference herein.

TECHNICAL FIELD

The invention relates to a luminaire and a visible light communication system using the same.

BACKGROUND ART

Conventionally, there has been provided a luminaire, which has a function of transmitting an optical signal, using a visible light as a medium. In other words, a light source for illumination is used also for transmission of the optical signal. In many cases, luminaires transmit different information as optical signals (e.g., information on a location of a luminaire itself as a transmission source).

As this type of luminaire, there has been also provided a luminaire, which is configured to randomly set a timing of transmitting an optical signal (e.g., JP 2006-203669 A).

Here, there is a case where luminaires of transmitting different optical signals are disposed closely to each other. In this case, when a receiver is at a location capable of receiving the optical signals transmitted from the luminaires, collision of the optical signals may occur.

In the case of randomly setting the timing of transmitting the optical signal as described above, if a time period (interval) during which no optical signal is transmitted is too short, the above-mentioned collision of the optical signals may occur with higher probability.

DISCLOSURE OF THE INVENTION

It is an object of the present invention to provide a luminaire, which can suppress collision of optical signals, and a visible light communication system using the same.

A luminaire of the invention includes an electric light source, a light source driver configured to turn on the light source, and a controller configured to control the light source driver. The controller is configured to control the light source driver to transmit, with a probability lower than 50% at a prescribed time interval, an optical signal with light of the light source as a medium while the light source is in ON. The prescribed time interval is longer than a time period during which the optical signal is transmitted.

In the luminaire, preferably, the light source driver is configured to receive an AC voltage to turn on the light source, and the luminaire further includes a timer configured to repeatedly count, as the prescribed time interval, a unit time in synchronization with the AC voltage. In this case, the unit time is one integer-th of a cycle of the AC voltage. The controller is configured to control the light source driver to transmit the optical signal, whenever the number of times of counting the unit time by the timer reaches a transmission cycle number being two or more integer, so that the optical signal is transmitted with the probability lower than 50% while the light source is in ON. The unit time is longer than the time period during which the optical signal is transmitted.

In the luminaire, preferably, the transmission cycle number is a prime number.

In the luminaire, preferably, while the light source is in ON and no optical signal is transmitted, the controller is configured to control the light source driver so that a light flux of the light source agrees with an average value of light fluxes of the light source while the optical signal is transmitted.

A visible light communication system of the invention includes: a plurality of luminaires, each of which is any one of the above-mentioned luminaires; and a receiver configured to receive optical signals from the plurality of luminaires.

In the visible light communication system, preferably, when there is a possibility of collision of optical signals between certain luminaires of the plurality of luminaires, the certain luminaires have transmission cycle numbers different from each other.

According to the invention, it is possible to more suppress collision of optical signals, compared with a conventional luminaire of merely randomly setting a timing of transmitting an optical signal.

BRIEF DESCRIPTION OF THE DRAWINGS

Preferred embodiments of the invention will now be described in further details. Other features and advantages of the invention will become better understood with regard to the following detailed description and accompanying drawings where.

BEST MODE FOR CARRYING OUT THE INVENTION

Hereinafter, best mode for carrying out the invention will be described with reference to drawings.

Embodiment 1

Figure 1:
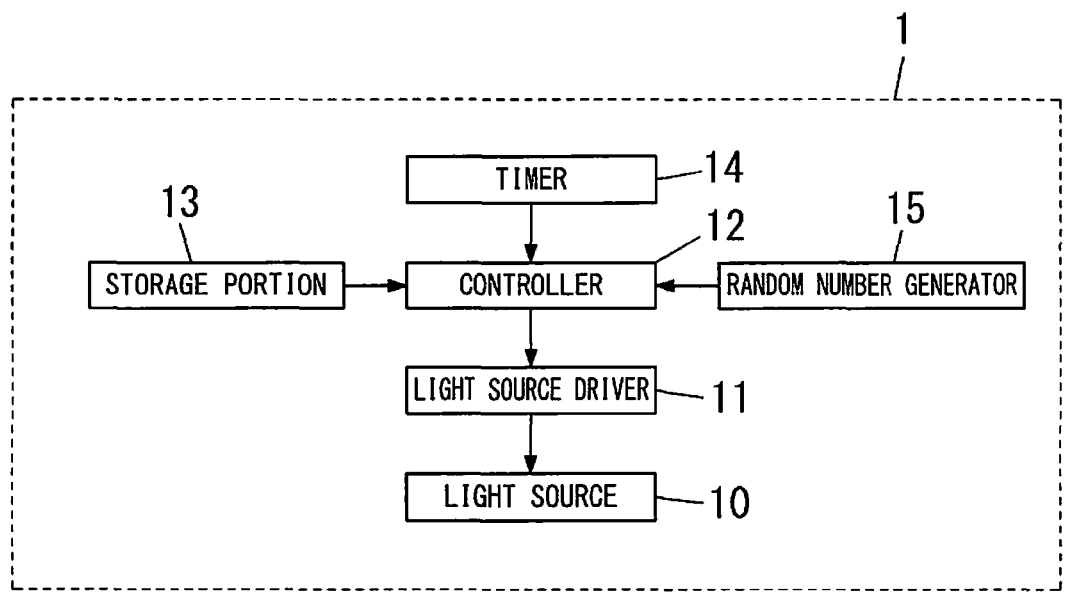
FIG. 1 is a block diagram illustrating a luminaire according to Embodiment 1 of the invention.

As shown in FIG. 1, a luminaire 1 of the embodiment includes an electric light source 10, a light source driver 11 configured to turn on the light source 10, and a controller 12 configured to control the light source driver 11.

For example, when the light source 10 is a DC light source such as a light-emitting diode, the light source driver 11 may include a well-known DC power supply circuit that is configured to turn on the light source 10, using DC power obtained by converting AC power received from an external.

The luminaire 1 further includes a storage portion 13, a timer 14 and a random number generator 15. The storage portion 13 is configured to store information to be transmitted with an optical signal. The timer 14 is configured to output a prescribed electric signal (hereinafter, referred to as a "notification signal") to the controller 12, whenever a state where the light source 10 is in ON and no optical signal is transmitted is kept for a prescribed time interval. The random number generator 15 is configured to generate a random number in response to a request from the controller 12. The storage portion 13 may be formed, using a well-known non-volatile memory, for example. The controller 12, the timer 14 and the random number generator 15 may be formed, using well-known electronic circuits. For example, the timer 14 may include an oscillator, or a detector that is configured to detect a zero-cross point of an AC voltage received from the external. If the timer 14 is configured to output the notification signal to the controller 12 whenever detecting the zero-cross point of the AC voltage received from the external "n" times (where "n" is a prescribed integer), the above-mentioned prescribed time interval corresponds to n/2 of a cycle of the AC voltage.

The controller 12 is configured to obtain the random number from the random number generator 15 when receiving the notification signal from the timer 14, and control the light source driver 11 to transmit the optical signal including the information stored in the storage portion 13 only when the obtained random number is less than a prescribed transmission threshold. The information to be transmitted with the optical signal is, for example, information on a location.

The luminaire may be further provided with an input portion (not shown) capable of modifying the information in the storage portion 13. In this case, the controller 12 may be configured to rewrite the information in the storage portion 13 according to an input to the input portion. The input portion may be configured to receive an operation input via an input device, such as a keyboard or a touch panel, or a radio signal using infrared light or radio waves as a medium, or an electric signal to be transmitted with a wire. In any cases, because the input portion can be provided by a well-known art, the drawing and detailed explanation thereof will be here omitted.

Here, the optical signal is adjusted to be transmitted with a probability lower than or equal to 50%. Specifically, if the random number generator 15 is configured to randomly generate a random number from a range of 0 to 1, the above-mentioned transmission threshold is set lower than or equal to 0.5. Accordingly, an expectation of the transmission interval between optical signals corresponds to twice or more of the above-mentioned prescribed time interval.

Further, the above-mentioned prescribed time interval is set longer than a time period during which the optical signal is transmitted (hereinafter, referred to as a "transmitting period"). In other words, an expectation of the transmission interval between optical signals is longer than twice of the transmitting period.

According to the above-mentioned configuration, it is possible to more suppress collision of optical signals between luminaires 1, compared with a conventional luminaire of merely randomly setting a timing of transmitting an optical signal.

Note that, while the light source 10 is in ON and no optical signal is transmitted (i.e., during a waiting period), the controller 12 may be configured to control the light source driver 11 so that a light flux of the light source 10 agrees with an average value of light fluxes of the light source 10 while the optical signal is transmitted (i.e., during the transmitting period). In the case of this configuration, it is possible to suppress flickering of the light source 10 due to repeatedly transmission of the optical signal. The light flux of the light source 10 may be adjusted by, for example, changing a value of a current to be output from the light source driver 11 to the light source 10.

Figure 2:
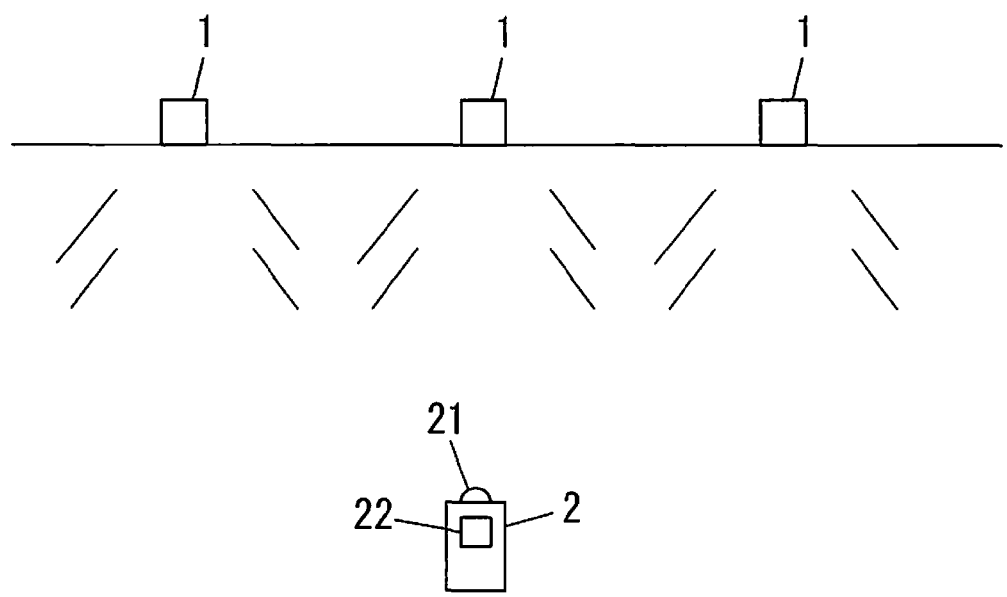
FIG. 2 is an explanatory drawing for a visible light communication system using the luminaire according to Embodiment 1 of the invention.

As shown in FIG. 2, a visible light communication system includes luminaires 1, each of which is the above-mentioned luminaire 1, and a receiver 2 configured to receive optical signals from the luminaires 1. The receiver 2 includes a receiving portion 21 and a displaying portion 22. The receiving portion 21 is configured to receive an optical signal, using a light receiving element such as a photodiode. The displaying portion 22 is configured to display information according to the optical signal received by the receiving portion 21, using an appropriate display means such as a liquid crystal panel. Because the receiver 2 can be provided by a well-known art, the detailed drawing and explanation thereof will be here omitted.

Embodiment 2

Figure 3:
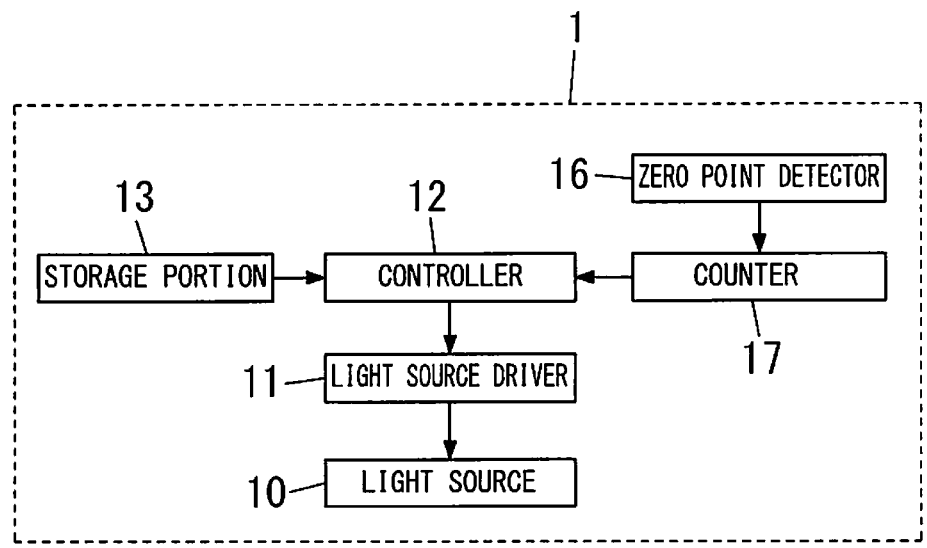
FIG. 3 is a block diagram illustrating a luminaire according to Embodiment 2 of the invention.

As shown in FIG. 3, a luminaire 1 of the embodiment is different from that of Embodiment 1 in that a zero point detector 16 and a counter 17 are provided, instead of the timer 14 and the random number generator 15. Note that, components similar to those of Embodiment 1 are assigned with same reference signs and the explanation thereof will be omitted.

Similarly to Embodiment 1, the luminaire 1 of the embodiment includes a light source 10, a light source driver 11 and a controller 12.

For example, when the light source 10 is a DC light source such as a light-emitting diode, the light source driver 11 may include a well-known DC power supply circuit that is configured to turn on the light source 10, using a DC voltage obtained by converting an AC voltage received from an external.

The luminaire 1 further includes a storage portion 13, the zero point detector 16 and the counter 17. The zero point detector 16 is configured to detect a zero-cross point (a zero point) of the above-mentioned AC voltage (a power supply voltage). The counter 17 is configured to output a prescribed electric signal (hereinafter, referred to as a "notification signal") to the controller 12 whenever the number of times of detecting of the zero-cross point by the zero point detector 16 reaches a prescribed transmission cycle number. The transmission cycle number is two or more integer. The storage portion 13 may be formed, using a well-known non-volatile memory, for example. The controller 12, the zero point detector 16 and the counter 17 may be formed, using well-known electronic circuits.

Figure 4:
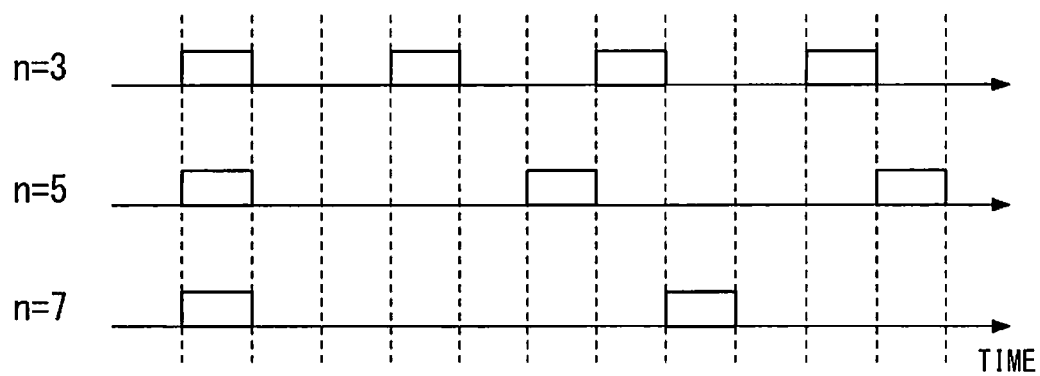
FIG. 4 is an explanatory drawing for an example of a time interval, at which an optical signal is transmitted, corresponding to a case where a transmission cycle numbers n is 3, 5 or 7 in the luminaire according to Embodiment 2 of the invention.

The controller 12 is configured to control the light source driver 11 to transmit an optical signal including information stored in the storage portion 13 when receiving the notification signal from the counter 17. The information to be transmitted with the optical signal is, for example, information on a location. Accordingly, the optical signal is periodically transmitted, and its cycle (i.e., transmission cycle) corresponds to a time period obtained by multiplying the transmission cycle number by a unit time. In the embodiment, an interval between adjacent zero-cross points (i.e., a half of a cycle of the power supply voltage as the AC voltage) is defined as the unit time. The zero point detector 16 corresponds to a timer. FIG. 4 shows a time interval, at which the optical signal is transmitted, corresponding to a case where a transmission cycle number n is 3, 5 or 7. In FIG. 4, an interval between adjacent broken lines corresponds to the unit time.

The luminaire may be further provided with an input portion (not shown) capable of modifying the information in the storage portion 13, or the transmission cycle number in the counter 17. In this case, the controller 12 may be configured to rewrite the information in the storage portion 13 or the transmission cycle number in the counter 17 according to an input to the input portion. The input portion may be configured to receive an operation input via an input device, such as a keyboard or a touch panel, or a radio signal using infrared light or radio waves as a medium, or an electric signal to be transmitted with a wire. In any cases, because the input portion can be provided by a well-known art, the drawing and detailed explanation thereof will be here omitted.

Here if the unit time is counted by each luminaire 1 independently, there is a possibility of collision of partially optical signals, such that a first half part of an optical signal transmitted from one luminaire 1 is collided with a second half part of an optical signal transmitted from another luminaire 1. Further if the unit time is less than a time period during which an optical signal is transmitted (hereinafter, referred to as a "transmitting period"), there is a possibility of collision of partially optical signals, such that a part, exceeding the unit time, of an optical signal transmitted from one luminaire 1 is collided with a head part of an optical signal transmitted from another luminaire 1.

However, in the embodiment, the zero-cross point of the power supply voltage is used as a division between unit times. In other words, the unit time is a half of a cycle of the power supply voltage and further in synchronization with the power supply voltage. Accordingly, in a case where luminaires 1 receive electric power from a common power supply, unit times in the luminaires 1 are synchronized with each other. In addition, in the embodiment the unit time is longer than the transmitting period. Therefore, it is possible to prevent at least the collision of partially optical signals as described above, compared with the case where the unit time is counted by each luminaire 1 independently or the case where the unit time is less than the transmitting period. Accordingly, it is possible to suppress collision of optical signals among the luminaires 1.

Note that, the unit time may be one integer-th of a cycle of the power supply voltage. For example by using only a zero-cross point at rise of a voltage, the unit time agrees with one cycle of the power supply voltage (i.e., 1/1). The detection of the zero-cross point may be performed at starting of the luminaire only when determining a timing of starting countering of the unit time or the size of the unit time, and the counting of the unit time after that may be performed by a well-known oscillator or the like. In this case, the unit time can be also obtained by dividing a cycle of the power supply voltage more finely. Here, it is preferred that the unit time is shortened as much as possible. In each case of FIG. 4, the transmitting period and the unit time that are equal to each other are illustrated. However, the unit time is actually set slightly longer than the transmitting period so that an optical signal fits within one unit time without fail even when considering variation of rounding of a waveform, a response speed or the like.

Similarly to Embodiment 1, while the light source 10 is in ON and no optical signal is transmitted (i.e., during the waiting period), the controller 12 of the embodiment may be configured to control the light source driver 11 so that a light flux of the light source 10 agrees with an average value of light fluxes of the light source 10 while the optical signal is transmitted (i.e., during the transmitting period). In the case of this configuration, it is possible to suppress flickering of the light source 10 due to repeatedly transmission of the optical signal. The light flux of the light source 10 may be adjusted by, for example, changing a value of a current to be output from the light source driver 11 to the light source 10.

Similarly to Embodiment 1 in FIG. 2, a visible light communication system of the embodiment includes luminaires 1 (three luminaires in the case of FIG. 2), each of which is the above-mentioned luminaire 1 of the embodiment, and a receiver 2 configured to receive optical signals from the luminaires 1. The receiver 2 may include a receiving portion 21 and a displaying portion 22. The receiving portion 21 is configured to receive an optical signal, using a light receiving element such as a photodiode. The displaying portion 22 is configured to display information according to the optical signal received by the receiving portion 21, using an appropriate display means such as a liquid crystal panel. Because the receiver 2 can be provided by a well-known art, the detailed drawing and explanation thereof will be here omitted.

Regarding the visible light communication system as above, when transmission cycle numbers among all of the luminaires 1 are made to agree with each other, and further timings of transmitting optical signals are shifted by the unit time, it is possible to provide time division multiplexing in which collision of the optical signals among the luminaires 1 can be surely prevented, as long as the number of the luminaires 1 is identical to the transmission cycle number.

However, regarding the visible light communication system as above, when there is a possibility of collision of optical signals between certain luminaires 1 of the luminaires 1 (i.e., in a case where irradiation areas of lights emitted from light sources 10 thereof are overlapped with each other), the certain luminaires 1 may be provided to have transmission cycle numbers different from each other. In this case, it is possible to prevent collision with respect to the optical signals regardless of timings of starting transmission of the optical signals, unlike the case where the transmission cycle numbers among all of the luminaires 1 are made to agree with each other.

In the case where the certain luminaires 1 are provided to have transmission cycle numbers different from each other as above, a frequency with which collision of optical signals occurs between two luminaires 1 is inversely proportional to the least common multiple of transmission cycle numbers of the two luminaires 1. For example, when the transmission cycle number of a first luminaire 1 is set to "5" and the transmission cycle number of a second luminaire 1 is set to "3", the least common multiple of the transmission cycle numbers is "15" and in this case, it means that when the first luminaire 1 transmits an optical signal three times, the optical signal is collided one time with an optical signal transmitted from the second luminaire 1. On the other hand, when the transmission cycle number of the second luminaire 1 is set to "6", the least common multiple of the transmission cycle numbers is "30" and in this case, it means that when the first luminaire 1 transmits an optical signal six times, the optical signal is collided one time with an optical signal transmitted from the second luminaire 1. In other words, the frequency with which collision of optical signals occurs between luminaires 1 is reduced with an increase in the least common multiple of the transmission cycle numbers of the luminaires 1.

In order to reduce a ratio of collision of optical signals (i.e., (the number of collision/the number of transmission)) as much as possible, it is preferred that when there is a possibility of collision of optical signals between certain luminaires 1, the transmission cycle numbers of the certain luminaires 1 are prime numbers (i.e., the greatest common divisor of the transmission cycle numbers is "1"). It is possible to relatively easily prevent the collision by setting a transmission cycle number of each luminaire 1 to a prime number.

As described above, the luminaire 1 includes the electric light source 10, the light source driver 11 configured to turn on the light source 10, and the controller 12 configured to control the light source driver 11. The controller 12 is configured to control the light source driver 11 to transmit, with a probability lower than 50% at a prescribed time interval, an optical signal with light of the light source 10 as a medium while the light source 10 is in ON. The prescribed time interval is longer than a time period during which the optical signal is transmitted.

The light source driver 11 is configured to receive an AC voltage to turn on the light source 10. The luminaire 1 further includes the timer (the zero point detector 16) configured to repeatedly count, as the prescribed time interval, a unit time in synchronization with the AC voltage. The unit time is one integer-th of a cycle of the AC voltage. The controller 12 is configured to control the light source driver 11 to transmit the optical signal, whenever the number of times of counting of the unit time by the timer (the zero point detector 16) reaches the transmission cycle number being two or more integer, so that the optical signal is transmitted with the probability lower than 50% while the light source 10 is in ON. The unit time is longer than the time period during which the optical signal is transmitted. In this case, it is preferred that the transmission cycle number is a prime number.

While the light source 10 is in ON and no optical signal is transmitted, the controller 12 is configured to control the light source driver 11 so that a light flux of the light source 10 agrees with an average value of light fluxes of the light source 10 while the optical signal is transmitted.

The visible light communication system includes the plurality of luminaires 1, each of which is the abovementioned luminaire 1, and the receiver 2 configured to receive optical signals from the plurality of luminaires 1.

In the visible light communication system, when there is a possibility of collision of optical signals between the certain luminaires 1 of the plurality of luminaires 1, the certain luminaires 1 have transmission cycle numbers different from each other.

Although the present invention has been described with reference to certain preferred embodiments, numerous modifications and variations can be made by those skilled in the art without departing from the true spirit and scope of this invention, namely claims.

The invention claimed is:

1. A luminaire, comprising:
   an electric light source;
   a light source driver configured to turn on the light source; and
   a controller configured to control the light source driver,
   the controller being configured to control the light source driver to transmit, with a probability lower than 50%, an optical signal with light of the light source as a medium, whenever a state where the light source is in ON and no optical signal is transmitted is maintained for a prescribed time interval,
   the prescribed time interval being longer than a time period during which the optical signal is transmitted.

2. The luminaire according to claim 1, wherein the light source driver is configured to receive an AC voltage to turn on the light source,
   the luminaire further comprising a timer configured to repeatedly count, as the prescribed time interval, a unit time in synchronization with the AC voltage, the unit time being one integer-th of a cycle of the AC voltage, and
   wherein the controller is configured to control the light source driver to transmit the optical signal, whenever a number of times of counting of the unit time by the timer reaches a transmission cycle number being two or more integer, so that the optical signal is transmitted with the probability lower than 50% while the light source is in ON,
   the unit time being longer than the time period during which the optical signal is transmitted.

3. The luminaire according to claim 2, wherein the transmission cycle number is a prime number.

4. The luminaire according to claim 3, wherein while the light source is in ON and no optical signal is transmitted, the controller is configured to control the light source driver so that a light flux of the light source agrees with an average value of light fluxes of the light source while the optical signal is transmitted.

5. A visible light communication system, comprising:
   a plurality of luminaires, each of which is the luminaire according to claim 4; and
   a receiver configured to receive optical signals from the plurality of luminaires.

6. The visible light communication system according to claim 5, wherein when there is a possibility of collision of optical signals between certain luminaires of the plurality of luminaires, the certain luminaires have transmission cycle numbers different from each other.

7. A visible light communication system, comprising:
   a plurality of luminaires, each of which is the luminaire according to claim 3; and
   a receiver configured to receive optical signals from the plurality of luminaires.

8. The visible light communication system according to claim 7, wherein when there is a possibility of collision of optical signals between certain luminaires of the plurality of luminaires, the certain luminaires have transmission cycle numbers different from each other.

9. The luminaire according to claim 2, wherein while the light source is in ON and no optical signal is transmitted, the controller is configured to control the light source driver so that a light flux of the light source agrees with an average value of light fluxes of the light source while the optical signal is transmitted.

10. A visible light communication system, comprising:
    a plurality of luminaires, each of which is the luminaire according to claim 9; and
    a receiver configured to receive optical signals from the plurality of luminaires.

11. The visible light communication system according to claim 10, wherein when there is a possibility of collision of optical signals between certain luminaires of the plurality of luminaires, the certain luminaires have transmission cycle numbers different from each other.

12. A visible light communication system, comprising:
    a plurality of luminaires, each of which is the luminaire according to claim 2; and
    a receiver configured to receive optical signals from the plurality of luminaires.

13. The visible light communication system according to claim 12, wherein when there is a possibility of collision of optical signals between certain luminaires of the plurality of luminaires, the certain luminaires have transmission cycle numbers different from each other.

14. The luminaire according to claim 1, wherein while the light source is in ON and no optical signal is transmitted, the controller is configured to control the light source driver so that a light flux of the light source agrees with an average value of light fluxes of the light source while the optical signal is transmitted.

15. A visible light communication system, comprising:
a plurality of luminaires, each of which is the luminaire according to claim 14; and
a receiver configured to receive optical signals from the plurality of luminaires.

16. The visible light communication system according to claim 15, wherein when there is a possibility of collision of optical signals between certain luminaires of the plurality of luminaires, the certain luminaires have transmission cycle numbers different from each other.

17. A visible light communication system, comprising:
a plurality of luminaires, each of which is the luminaire according to claim 1; and
a receiver configured to receive optical signals from the plurality of luminaires.

18. The visible light communication system according to claim 17, wherein when there is a possibility of collision of optical signals between certain luminaires of the plurality of luminaires, the certain luminaires have transmission cycle numbers different from each other.

* * * * *